United States Patent [19]
Avery

[11] Patent Number: 5,802,893
[45] Date of Patent: Sep. 8, 1998

[54] HYDRAULIC TRACTOR THEFT PREVENTION DEVICE

[76] Inventor: Mike Avery, 1699 Donna Lynn Dr., Smyrna, Ga. 30080

[21] Appl. No.: 410,495

[22] Filed: Mar. 24, 1995

[51] Int. Cl.⁶ .................................................. F16K 35/00
[52] U.S. Cl. .............................. 70/180; 70/242; 137/383
[58] Field of Search ........................... 70/175–180, 212, 70/242, 54, 55; 137/383, 384.2, 385; 188/353

[56] References Cited

U.S. PATENT DOCUMENTS

| | | | |
|---|---|---|---|
| 1,115,792 | 11/1914 | Drew | 70/176 X |
| 1,510,289 | 9/1924 | Marsh | 70/177 X |
| 1,714,856 | 5/1929 | Douglas | 70/176 |
| 2,081,464 | 5/1937 | Stewart | 303/56 |
| 2,099,869 | 11/1937 | Stainbrook | 70/180 |
| 2,390,972 | 12/1945 | Weinberg | 70/180 |
| 2,659,242 | 11/1953 | Blanning | 70/180 X |
| 3,532,111 | 10/1970 | Hansen | 70/180 X |
| 3,554,218 | 1/1971 | Smith | 70/176 X |
| 3,617,663 | 11/1971 | Whittemore | 188/353 X |
| 3,653,730 | 4/1972 | Cvetkovich | 188/353 X |
| 3,866,446 | 2/1975 | Lemley | 70/176 |
| 4,402,339 | 9/1983 | Owens | 137/384.6 |
| 4,765,362 | 8/1988 | Baruch | 137/384.6 |
| 4,926,900 | 5/1990 | Pietras | 70/178 X |
| 4,928,506 | 5/1990 | Radziewicz | 70/176 |
| 5,046,523 | 9/1991 | Horhota | 70/179 X |
| 5,205,317 | 4/1993 | Neverberg et al. | 137/383 X |
| 5,244,008 | 9/1993 | Bauer | 70/180 X |
| 5,305,622 | 4/1994 | Flores | 70/180 X |
| 5,390,768 | 2/1995 | Borkowski | 70/180 X |

FOREIGN PATENT DOCUMENTS

| | | | |
|---|---|---|---|
| 2026134 | 1/1980 | United Kingdom | 137/385 |
| 1580183 | 11/1980 | United Kingdom | 137/384.2 |

Primary Examiner—Suzanne Dino
Attorney, Agent, or Firm—Isaf, Vaughan & Kerr

[57] ABSTRACT

An anti-theft device for use with tractors having hydraulically released braking mechanisms comprises a two-way valve having a handle that can be rotated to a secure position directing hydraulic fluid back to the reservoir and an operating position directing hydraulic fluid to the brake release mechanism. Locking means is provided to lock the handle in its secure position when the tractor is unattended to prevent the brakes from being released and thus to prevent theft of the vehicle.

5 Claims, 1 Drawing Sheet

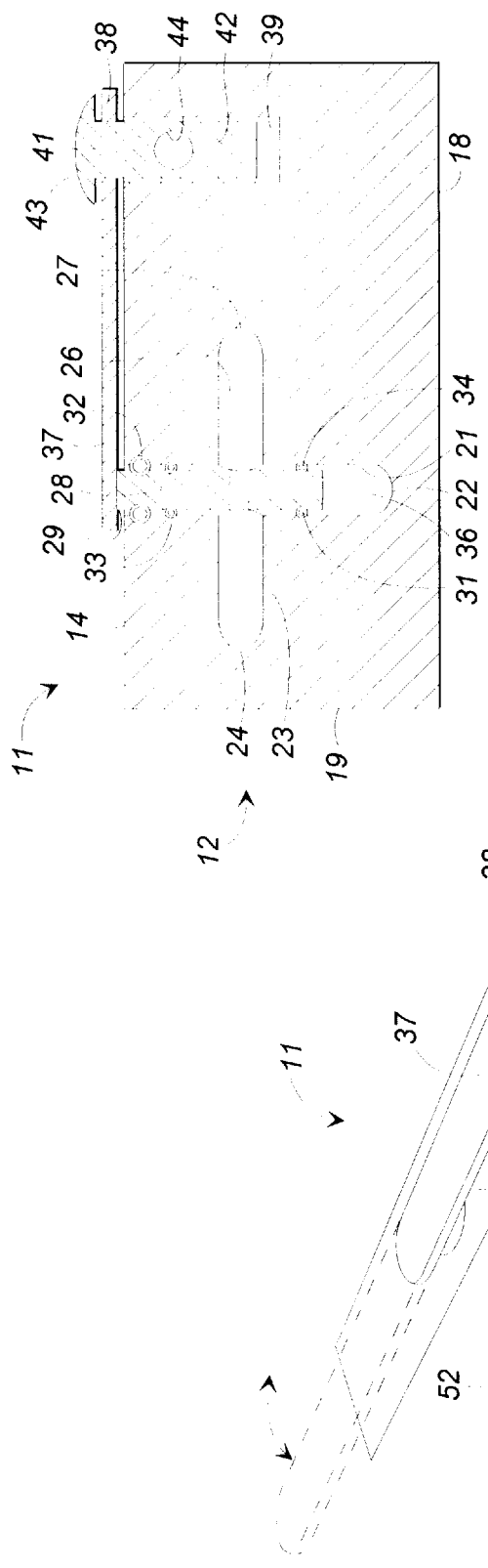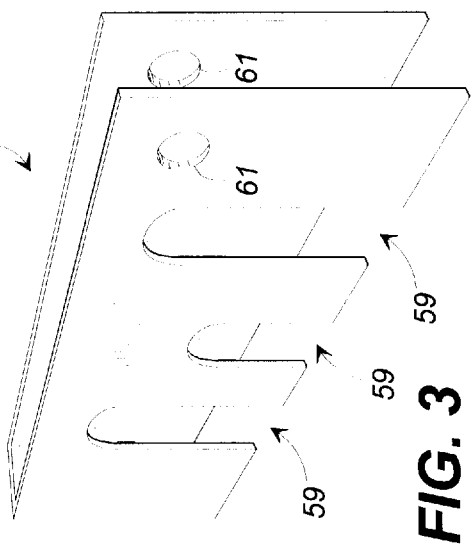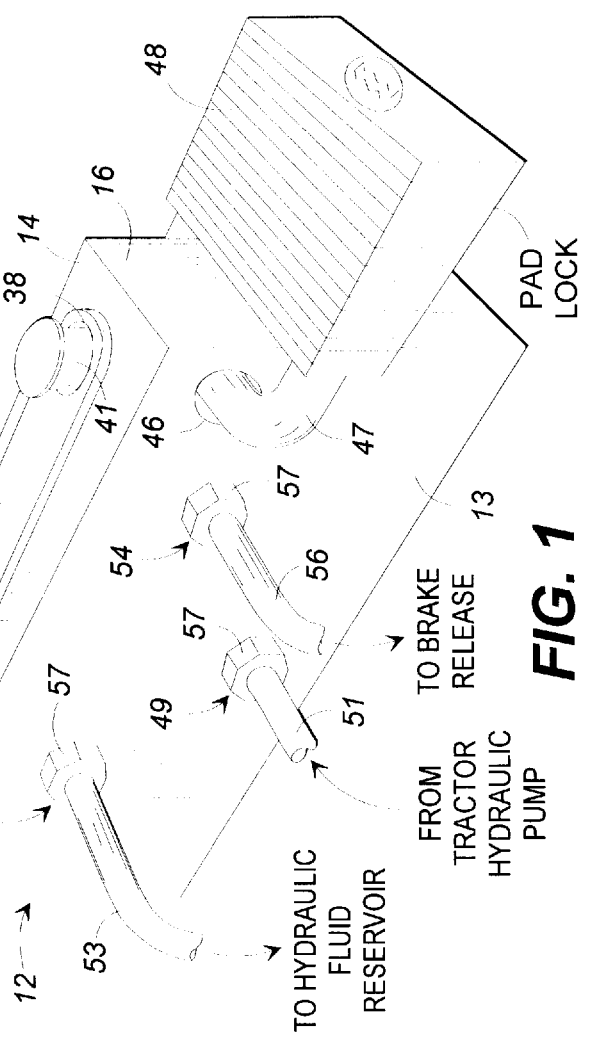

HYDRAULIC TRACTOR THEFT PREVENTION DEVICE

TECHNICAL FIELD

The present invention relates generally to vehicle theft prevention and more particularly to devices for deterring the theft of large bulldozer type tractors having hydraulically controlled brake systems.

BACKGROUND OF THE INVENTION

Theft of large earth moving equipment such as bulldozers has reached epidemic proportions within the United States and elsewhere. This type of equipment is extremely expensive. In addition, it must often be left on site overnight and over weekends because of the expense and inconvenience of moving the equipment to a safe location everyday. It is not uncommon for such equipment to be stolen in the middle of the night by thieves who simply back a flat bed trailer up to the equipment, hot wire the engine of the equipment, drive it onto the flat bed trailer, and absconded with their ill-gotten booty. Attempts to secure such equipment by taking the keys, chaining the steering wheels, and the like have not proven successful because thieves simply cut the chains and steal the equipment anyway. Even where uncuttable tool steel or stainless chains are used, thieves have been known simply to push the vehicle up a ramp and onto a flat bed truck.

A majority of large earth moving equipment such as, for example, the caterpillar model 953 loader, is provided with a hydraulic braking system. In such a system, the brakes are normally held securely in their applied positions by a large spring or the like. The purpose of this arrangement is to insure that the vehicle does not roll down a hill while the engine is not running. When the engine is started on such vehicles, hydraulic fluid under pressure is drawn from a reservoir and directed to a brake release actuator, which releases the brakes against the bias of the spring so that the vehicle can be driven. Thus, in these vehicles, the brakes are automatically released when the engine is started and the hydraulic system engaged. While serving useful purposes, this arrangement makes the vehicle easy to steal if a thief can simply hot wire or otherwise start its engine.

Attempts have been made in the past to provide security against theft of such equipment by preventing the brakes from being released automatically when the engine is started. One such attempt is disclosed in U.S. Pat. No. 4,402,339 of Owens. The Owens device discloses a hydraulic by-pass value in which a piston is longitudinally slidable within the cylinder of a manifold. The piston is movable between a first position wherein communication is established between a hydraulic inlet port and a hydraulic bypass port coupled directly back to the hydraulic fluid reservoir, and a second position wherein communication is established between the inlet port and an outlet port that is coupled to the brake release mechanism. A key operated lock assembly is positioned within the manifold to lock the slidable piston releasably in its first position. When so locked, hydraulic fluid is simply circulated through the value and back to the reservoir when the engine is started so that the brakes are not released.

While the device of Owens is a step in the right direction, it nevertheless is plagued with various problems and shortcomings inherent in its design. Primary among these problems is the vulnerability of the Owens device to vandalism. This is due in part to the fact that the tumbler and key locking mechanism is fragile and can easily be defeated by jimmys and other tools used by would-be thieves. In addition, the Owens device is unduly complicated since it involves a key lock mechanism, a slidable contoured piston, and a biasing spring. Further, the environments in which dozer type tractors are operated are inherently extremely dirty and greasy. This dirt and grease can easily migrate into the key lock mechanism of Owens and can damage or defeat its operation. This problem is enhanced because the manifold of the Owens device is not completely sealed since an air escape port 38 is required to allow the piston to slide within the cylinder. Dust, dirt, and oil can migrate through this port and into the manifold where it can damage the piston and seals and eventually ruin the entire device.

Another example of an attempt to address these problems is shown in U.S. Pat. No. 4,765,362 of Baruch. Like the Owens device, the Baruch device is extremely complicated, easily defeated and subject to dirt and breakdown.

In a quest for a simpler and more reliable way to defeat a thief, some owners of bulldozer type vehicles have manually disabled the brake release mechanism by disconnecting appropriate hydraulic lines or by coupling the hydraulic supply line directly to the hydraulic return line with a "u" section of hydraulic tubing. While this approach is indeed simple, it nevertheless is unreliable since a thief can simply reconnect the hydraulic lines or reconfigure the u-shaped tubing to deliver fluid to the brake release mechanism. Thus, these manual methods have not proven successful.

Accordingly, there exist a continuing and heretofore unaddressed need for a simple, efficient, reliable, and virtually undefeatable method of securing large earth moving vehicles against theft by preventing the brakes of the vehicles from being released when the engine is started. It is to the provision of such a method and apparatus that the present invention is primarily directed.

SUMMARY OF THE INVENTION

Briefly described, the present invention, in a preferred embodiment thereof, comprises an anti-theft device for use with vehicles having hydraulically released brake mechanisms. The device comprises a block shaped hardened tool steel body having opposed faces, a top side edge, bottom side edge and ends. A valving mechanism with appropriate inlet and outlet ports is provided within the block. The valving mechanism is configured to receive hydraulic fluid under pressure and direct it either to the brake release mechanism of the tractor or alternatively directly back to the fluid reservoir, bypassing the release mechanism. A handle is connected to the valving mechanism and can be manipulated to provide fluid to the brake release mechanism or to bypass the brake release mechanism as desired. A tamper proof locking device is provided for locking the handle in the bypass position of the valving mechanism. In a preferred embodiment, the locking mechanism comprises a harden steel pin that is inserted through a hole in the handle and into a receiving bore in the block. The block is provided with a transverse passageway that intersects the pin receiving bore and that can be aligned with a corresponding eye in the pin. With the pin inserted, an industrial padlock can be locked into position with its hasp extending through the block and the pin to prevent the handle from being moved.

Thus, the present invention provides a tamper-proof locking mechanism for hydraulically controlled brake systems that is simple, convenient, highly resistant to defeat and tampering, and fully internally sealed against migration of dirt, grease, and other contaminants. These and other objects, features, and advantages of the invention will become more apparent upon review of the detailed description set forth below taken in conjunction with the accompanying drawings figures, a brief description of which follows.

BRIEF DESCRIPTION OF THE DRAWINGS

FIG. 1 is a perspective view showing an anti-theft device that embodies principles of the present invention in a preferred form.

FIG. 2 is a vertical cross sectional view of the anti-theft device of FIG. 1 showing the configuration of internal passage ways and functional elements thereof.

FIG. 3 is a perspective view of a hardened steel casing or skirt for use with the invention to provide further security.

DETAILED DESCRIPTION OF THE PREFERRED EMBODIMENT

Referring now to the drawings, in which like numerals represent like parts throughout the several views, FIG. 1 illustrates an anti-theft device that embodies principles of this invention and one preferred form. The device 11 comprises a generally rectangular block shape body 12 having a face 13, a top side 14, and an end side 16. It will be understood that the block 12 also has a face 17 (not shown) that forms the opposite side of the block 12. The block also has a bottom side 18 and a second end 19 (FIG. 2). Preferably, the entire block 12 is formed of hardened tool steel or stainless steel so that it cannot be cut with a saw or torch.

As illustrated in FIG. 2, the block 12 is formed with a vertical cylindrical bore 21 that extends from the top side 14 of the block 12 to a terminal end 22 within the block 12. A first internal passage way 23 communicates at one end with the bore 21 and extends laterally therefrom within the block to an internal terminal end 24. Similarly, a second internal passageway 26 communicates with the bore at a diametrically opposed location relative to the first internal passageway and extends laterally from the bore to an internal terminal end 27. In fabricating the opposed passageways 23 and 26, it is expedient to drill a hole through the end 19 of the block with the hole intersecting the bore 21. The hole can then be plugged or sealed at its end to form passageways 23 and 26 that are entirely sealed and internal to the block.

A cylindrical valve core 28 has an external end 29 and an internal end 31. The valve core 28 is disposed within the bore 21 with its external end 29 protruding slightly above the surface of the top side 14 and with its internal end 31 spaced from the terminal end 22 of the bore 21. A spring steel locking ring 32 is disposed in aligned annular grooves in the valve core 28 and the wall of the bore 21. The locking ring 32 serves to prevent longitudinal movement of the valve core 28 within the bore 21 while allowing rotational movement of the valve core. Conventional sealing means such as o-rings 33 and 34 are positioned about the valve core 28 to straddle the location where the internal passageways 23 and 26 intersect the bore 21.

The valve core 28 is machined with a conduit 36 that communicates between the terminal end 31 of the valve core and the side of the valve core at the position of the internal passageways 23 and 26. With this configuration, it will be seen that with the valve core in the position shown in FIG. 2, communication is established through the conduit 36 between the terminal end portion of the bore 21 and the first internal passageway 23. Similarly, when the valve core 28 is rotated 180° from the position shown in FIG. 2, communication is established through the conduit 36 between the terminal end portion of the bore and the second internal passageway 26.

An elongated stainless steel or hardened tool steel handle 37 is welded or otherwise permanently secured to the external end 29 of the valve core 28. As best seen in FIG. 2, the handle 37 is oriented such that when the valve core is in position establishing communication with the first internal passageway 23, the handle is oriented along the top side 14 of the block 12. The handle 37 is formed with a hole 38 extending through the handle at its distal end. The block 12 is provided with a locking pin receiving bore 39 that extends into the block 12 from the top side thereof. The locking pin receiving bore 39 is positioned to align with the hole 38 in the handle 37 when the handle is in position extending along the top side of the block as shown in FIG. 2.

A hardened tool steel or stainless steel locking pin 41 is sized to be inserted through the hole 38 in the handle and into the locking pin receiving bore 39 when the handle hole and the locking pin receiving bore are aligned. The locking pin 41 has a shaft 42 and a rounded shaped head portion 43. The locking pin 41 is formed with an eye 44 that extends through the shaft 42 of the pin. The eye 44 is positioned to align with a hasp receiving bore 46 formed through the block 12 adjacent the end side 16 thereof when the locking pin is in position extending into the locking pin receiving bore 39. As best seen in FIG. 1, when the locking pin 41 is inserted through the hole 38 and into the locking pin receiving bore 39 with its eye 44 aligned with the hasp receiving bore 36, the hasp 47 of a conventional industrial padlock 48 can be inserted through the hole 46 and through the eye 44 to lock the pin securely in place. This in turn locks the handle securely in place as well.

A hydraulic fluid inlet port 49 communicates through the face 13 of the block 12 with the terminal end portion of the bore 21. The port 49 is coupled through a hydraulic hose 51 to receive hydraulic fluid under pressure from the vehicle's hydraulic fluid pump. A bypass port 52 communicates through the face 13 with the first internal passageway 23 within the block 12. The bypass port 52 is coupled through a hose 53 to deliver hydraulic fluid from the block 12 back to the hydraulic fluid reservoir. A delivery port 54 communicates through the face 13 with the second internal passageway 26 within the block 12. The port 54 is coupled through a hose 56 to deliver hydraulic fluid to the conventional brake release actuator of the vehicle to release the brakes thereof. The ports 49, 52, and 54 can be of any common construction such as, for example, threaded bores extending through the face 13 that receive threaded hydraulic coupling nuts 57 for attaching the hydraulic hoses to the device. Other means for attaching the hydraulic hoses to the block may also be implemented.

As illustrated in FIG. 3, a tamper proof skirt or casing 58 can be provided to ensure additional security against tampering with and defeating the device of this invention. The casing preferably is formed of hardened tool steel or stainless steel and is configured to be slid down over the top of the block 12. One leg of the casing 58 is provided with slots 59 positioned to receive the hydraulic tubes 51, 53 and 56 when the casing 58 is slid down over the block 12. When slid fully onto the block, holes 61 align with the hasp receiving bore 46 of the block so that the padlock can be passed through the block and through the hole 61 to hold the casing 58 in place. The slots 58 have a width that is just slightly more than the diameter of the hydraulic hoses so that when the casing 58 is inserted on the block, the casing wall covers the coupling nuts 57 preventing a thief from unthreading or otherwise tampering with the nuts.

In use, the device of the present invention is installed on a vehicle with the appropriate hydraulic lines coupled as shown in FIG. 1. When it is desired to disable the vehicle so that it cannot be stolen or otherwise moved, the handle 37 is rotated to its secure position as shown in FIG. 2. The locking pin 41 is then inserted through the handle and into the block whereupon the casing 58 can be slid over the block and the padlock hasp inserted through the block, pin, and casing to secure the entire unit. In this configuration, hydraulic fluid is simply recirculated back to the hydraulic fluid reservoir and is not directed to the brake release system. Thus, even if the vehicle is hot wired or otherwise started, the vehicle brakes remain applied and the vehicle cannot be moved. When it is desired to operate the vehicle legitimately, the lock and pin are simply removed and the handle is rotated to its working position as shown in phantom lines in FIG. 1. In this position, hydraulic fluid is delivered through the valve core to the brake release mechanism, thus releasing the brakes and allowing the vehicle to move.

The hardened tool steel construction of the components of this invention ensures that a would-be thief cannot cut any of the locking components of the invention or otherwise defeat the device. For this purpose, the handle 37 preferably extends close to the top side 14 of the block to prevent attempts to cut the valve core 28 from above. Also, as illustrated in FIG. 2, the top of pin 41 is formed with a curved head that rests against the top of the handle 37 when the pin is in place to prevent attempts to cut the pin. With these safeguards, it is virtually impossible for a would-be thief to defeat the device of this invention once it is locked in place with an industrial padlock.

The invention has been described herein in terms of a preferred embodiment. Clearly, additions, deletions, and modifications, may well be made to the illustrated embodiment without departing from the scope of the invention. For example, the locking pin and padlock arrangement of the preferred embodiment might well be replaced with an equivalent locking means such as, for example, a handle cover that locks in place on the block. Thus, the term locking means when used in the claims hereof should be understood to encompass any means for locking the handle 37 in place. In addition, the rectangular block configuration of the illustrated embodiment is preferable because of its ease of machining in hardened steel. Clearly, however, other external configurations of the invention might well be imployed. These and many other modifications may well be made to illustrated preferred embodiment without departing from the spirit and scope of the invention as set forth in the claims.

I claim:

1. An anti-theft device for use with vehicles having brakes that are normally applied to prevent vehicle movement and that are hydraulically released for use when the vehicle is started, the vehicle including a hydraulic fluid reservoir for containing hydraulic fluid and a hydraulic fluid pump for delivering hydraulic fluid under pressure to a brake release actuator from which the hydraulic fluid recirculates to the reservoir, said anti-theft device comprising:

a substantially rectangular block-shaped body having opposed first and second faces, opposed top and bottom sides, and opposed ends;

a substantially cylindrical bore extending from said top side of said body to a terminal end of said bore within said body;

a first internal passageway formed in said body with said first internal passageway communicating with said cylindrical bore and extending therefrom to a terminal end within said body;

a second internal passageway formed in said body with said second internal passageway communicating with said cylindrical bore and extending therefrom to a terminal end within said body, said terminal end of said second internal passageway being displaced from said terminal end of said first passageway;

a substantially cylindrical valve core having a longitudinal axis, an external end and an internal end and being positioned within said substantially cylindrical bore, wherein said external end is located at said top side of said body and said internal end is positioned within said bore spaced from said terminal end thereof;

said first and second internal passageways communicating with said bore at a position intermediate said external and internal ends of said valve core;

sealing means for sealing said valve core against an interior surface of said bore adjacent said external and internal ends thereof;

a conduit formed in said valve core with said conduit having a first end communicating with said terminal end of said bore and a second end communicating with said bore at a position corresponding to a location where said first and second internal passageways communicate with said bore;

said valve core being rotatable about said longitudinal axis within said bore between a first position wherein said second end of said conduit communicates with said first internal passageway and a second position wherein said second end of said conduit communicates with said second internal passageway;

an elongated handle having a first end and a second end, wherein said first handle end is fastened to said exterior end of said valve core, said handle having a secure position, wherein said handle extends from said valve core exterior end, along said top side of said block, such that when said valve core is in said valve core first position, a longitudinal axis of said handle is aligned with a longitudinal axis of said block, and wherein exterior edges of said handle are disposed inwardly of edges of said top surface;

a locking mechanism disposed near said second handle end for locking said handle means in said secure position;

a fluid inlet port coupled to and communicating with said bore at the terminal end thereof for receiving hydraulic fluid under pressure from the hydraulic pump;

a first fluid outlet port coupled to and communicating with said first internal passageway adjacent the terminal end thereof for delivering hydraulic fluid back to the hydraulic fluid reservoir; and a second fluid outlet port coupled to and communicating with said terminal end of said second internal passageway for delivering hydraulic fluid to the brake release actuator, whereby when said handle is locked in place in said secure position, hydraulic fluid is directed from the hydraulic pump through said valve core, said first internal passageway and back to the reservoir leaving the brakes engaged so that the vehicle can not be operated and when said handle is unlocked and rotated from said secure position, hydraulic fluid is directed from the hydraulic pump through said valve core, said second internal passageway and to the brake release actuator to release the brakes for operation of the vehicle.

2. The anti-theft device as claimed in claim 1, wherein said block, said handle, and said valve core are formed from hardened steel to prevent sawing or cutting to defeat said device.

3. The anti-theft device as claimed in claim 2 further comprising:

a handle bore formed in said handle, adjacent said handle second end;

wherein said locking mechanism comprises a locking pin and a locking pin receiving hole, said locking pin receiving hole being formed in said top side of said block and being positioned to align with said handle bore when said handle is in said secure position so that said locking pin can be inserted through said handle bore and into said locking pin receiving hole; and wherein said locking mechanism releasably locks said locking pin in place within said locking pin receiving hole.

4. The anti-theft device as claimed in claim 3, wherein said locking mechanism further comprises:

a hasp receiving bore extending through said block and intersecting said locking pin receiving hole and an eye extending through said locking pin and being positioned to align with said hasp receiving bore when said locking pin is in position within said locking pin receiving hole; and a padlock having a hasp sized to be inserted through said hasp receiving bore and through said locking pin to secure said pin in place for locking said anti-theft device in said secure configuration.

5. A method of securing a vehicle having hydraulically released brake mechanism, said method comprising the steps of:

(a) providing a rotary valve adapted for selective direction of hydraulic fluid to the vehicle brake release mechanism or back to a hydraulic fluid reservoir, said valve having a handle with a secure position wherein fluid is directed back to the reservoir and an operating position wherein fluid is directed to the brake release mechanism;

(b) rotating the handle to said secure position when it is desired to secure the vehicle against unauthorized use; and (c) locking the handle in place in said secure position to prevent the brakes from being released thus securing the vehicle against unauthorized use.

\* \* \* \* \*